Feb. 7, 1961     J. A. BERTSCH     2,970,491

BEARING AND SPEED REDUCTION MECHANISM

Filed July 2, 1959

INVENTOR.
JOSEF A. BERTSCH

BY

ATTORNEY

United States Patent Office 2,970,491
Patented Feb. 7, 1961

2,970,491

BEARING AND SPEED REDUCTION MECHANISM

Josef A. Bertsch, Reading, Pa., assignor to Dana Corporation, Toledo, Ohio, a corporation of Virginia Filed July 2, 1959, Ser. No. 824,733

9 Claims. (Cl. 74—206)

This invention relates to low friction bearings for use with rotating shafts and spindles in general and is particularly directed to a bearing and speed reduction combination for use with shafts and spindles that revolve at extremely high speeds such as those used in gas turbines and blowers.

A primary object of this invention is to provide a high speed input shaft bearing support in combination with speed reduction means. The mechanism includes a cage, an input shaft disposed in the cage and a plurality of countershafts having rollers thereon for supporting the input shaft for rotation. The rollers, having rolling contact with the input shaft, serves two functions; one, to journal the input shaft for high speed rotation without the use of bearings, and two, to transmit rotation from the input shaft to the countershafts at a reduced rate.

A further object of this invention is to provide a mechanism of this type which is simple in constructtion, efficient in operation, inexpensive to assemble and manufacture.

Further objects and advantages will become apparent upon reading the following specification together with the accompanying drawings which form a part hereof.

Figure 1:
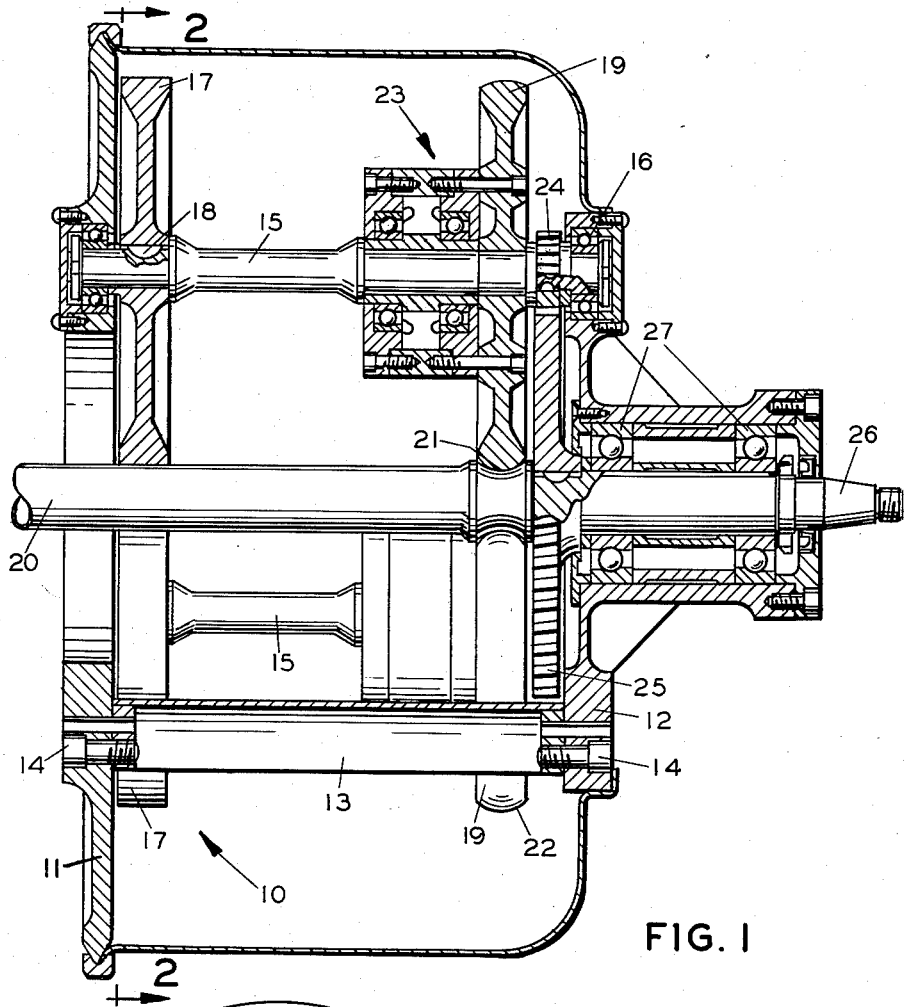
Fig. 1 is a sectional elevation of a bearing and speed reduction unit constructed in accordance with this invention.
Figure 2:
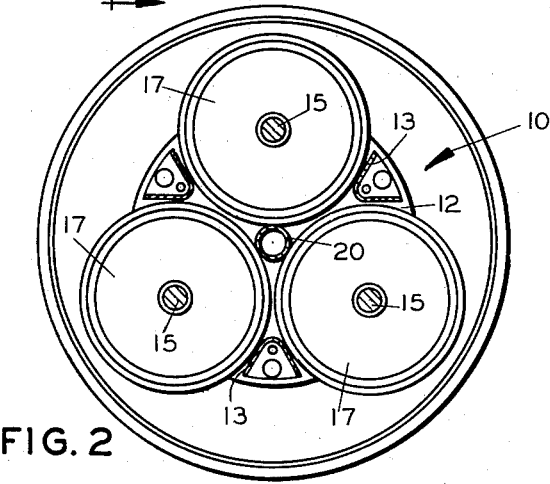
Fig. 2 is a transverse sectional view taken substantially along line 2—2 of Fig. 1.

The requirement for high speed bearings in industry today is increasing. To keep the size of rotating equipment such as gas turbines and blowers small, and the output speed low, creates the problem of operating this type of equipment at very high velocities.

The present highly developed machine tools are capable of operation at high velocities, especially in grinding machine applications. Velocities of 100,000 r.p.m. are in order with wheels of about one-quarter inch in diameter in machines of this type. The great amount of heat developed in the ordinary roller or ball bearing makes them unfit for use at such velocities. At the present time ball bearings having bores of one inch in diameter do no have a sufficient lifetime for velocities in the nature of 100,000 r.p.m.

Much research has been done to develop the older and well known plain cylindrical journal bearing for operation at high velocities but these bearings must be supplied with high pressure air or oil for cooling because of the great amount of heat generated at these velocities.

The structure, hereinafter described, has the advantage of supporting a high speed spindle or shaft having an over-hanging load or center load without over-loading one of the bearings. This structure further eliminates expensive accessories such as high pressure air and oil pumps for cooling purposes.

A feature of this structure is in the supporting rollers which provide a speed reduction means as well as journal supports for the input shaft. This speed reduction means permits the use of a conventional gear set in obtaining a desired velocity of the power output shaft. The combination of the bearing speed and speed reduction mechanism allows the use of a conventional gear set as the power input transmitted by the rollers is "soft." This eliminates the use of precision gearing which would still only have a limited life at high velocities.

A bearing and speed reduction unit, according to this invention includes a cage, indicated as a whole by the reference numeral 10, composed of a plate 11, a housing 12, and a plurality of spacing members 13. The plate 11 and the housing 12 are secured to the members 13 as by cap screws 14, or in any conventional well known manner. The plate 11 and the housing 12 are further provided with a plurality of circumferentially spaced, axially aligned apertures for supporting the countershafts 15. The countershafts 15 are journaled in bearings 16 at their outer extremities and are parallel to each other. The bearings 16 are supported in the plate 11 and the housing 12 on eccentric structures, not shown, which are conventional in design. These eccentric structures allow the friction rollers 17 and 19 to be adjusted relative to the input shaft 20, for frictionally transmitting rotary motion from the input shaft 20 to the countershafts 15.

A set of three friction rollers 17 are drivingly connected, as by keys 18, to the countershafts 15, inwardly from and adjacent to the plate 11. A second set of three friction rollers 19 are mounted on, and are rotatable relative to, the countershafts 15 inwardly from the housing 12.

An input shaft 20 is centrally supported between the peripheries of the rollers 17 and 19. This shaft 20 is provided with an integral, concave inner race 21 at its inwardly extending end for meshing with the rollers 19.

As shown in Fig. 1, the rollers 17 are cylindrical and receive radial loads only from the input shaft 20. The rollers 19 of the second set are crowned as at 22 and run in the concave inner race 21 of the input shaft 20. Being crowned and meshing with the race 21 it is to be seen that the rollers 19 take axial thrust loads as well as radial loads thereby retaining the input shaft 20 from axial movement. It is to be noted that the concave inner race is formed with a slightly larger radius than the radius of crown 22. This arrangement prevents a contact at different diameters which would create excessive heat. The pitch diameter of the inner race 21 is equal to the diameter of the input shaft 20, which means that the same velocity for both roller sets 17 and 19 occurs only when rollers 19 contact the inner race at its pitch diameter.

When the input shaft 20 tends to move axially, as from "end play," and the rollers 19 contact the inner race 21 at other points than the pitch diameter thereof, different velocities are developed between the rollers 17 and 19. To overcome this objection an overrunning clutch assembly 23 is attached to the rollers 19 relative to the countershafts 15, and permits the rollers 19 to overrun the countershafts 15. Drive gears 24 are mounted on each of the countershafts 15 and are disposed between the rollers 10 and the housing 12. These drive gears 24 mesh withoutput gears 25 which are drivingly connected to an output shaft 26 journaled in bearing 27 provided in the housing 12.

In operation the rollers 17 have two functions; one, to journal the input shaft 20 for rotation and two, to transmit rotation from the input shaft 20 at a reduced rate to the countershafts 15. The rollers 19 normally only journal the input shaft 20 for rotation.

The flow of power through the mechanism is normally from the input shaft 20 to the rollers 17 by frictional contact therebetween. Thence from the gears 24 to the output gear 25 which is secured to the output shaft 26. When the normal driving set of rollers 17 slip, or tend to slip, at momentarily high peaks of loading the idling set of rollers 19 will transmit rotary motion from the input shaft 20 to the countershafts 15 because of the characteristics of the overrunning clutch 23 attached thereto.

From the foregoing it can be seen that rotating equipment, such as gas turbines, can be made small and compact by the use of a mechanism built according to this invention as they can be operated at extremely high velocities. For example, assuming the supporting rollers to have a speed reduction ratio of 6:1 and by attaching a simple gear set thereto, reduction can be extended to 36.1, i.e., from 120,000 r.p.m. input to 3,300 r.p.m. output.

It will be obvious that various changes in the details which have been herein described and illustrated in order to explain the nature of this invention, may be made by those skilled in the art within the principle and scope of the invention as expressed in the appended claims.

What is claimed is:

1. A combined bearing and speed reduction mechanism comprising, an input shaft having an annular groove at its one extremity, a plurality of countershafts circumferentially spaced around said input shaft, a wheel rotatably mounted on each of said countershafts having crowned peripheries for cooperating with said circular groove of the input shaft, thereby axially restraining said input shaft, a second wheel fixedly secured to each of said countershafts and being adapted to bear on the surface of the input shaft for frictional contact therewith, the wheels further being of a different diameter than said input shaft, whereby said wheels journal the input shaft and transmit rotary motion from the input shaft to the countershafts at a different rate.

2. A combined bearing and speed reduction mechanism according to claim 1 in which the rollers having relative rotary motion in relation to the countershafts are provided with a clutch thereby allowing them to overrun the said countershafts.

3. In a bearing and speed reduction mechanism, the combination of an input shaft and a support in which it is mounted, a plurality of countershafts arranged around the input shaft in the support, a roller fixedly secured on each of said countershafts and bearing on the surface of the input shaft, a second roller rotatably mounted on each of said countershafts and bearing on the surface of the input shaft, said rollers being of a diameter larger than the diameter of the input shaft, whereby said rollers journal said input shaft for rotation and further transmit rotary motion from the input shaft to the countershafts at a reduced rate.

4. A bearing and speed reduction mechanism, in combination, comprising, a cage, an input shaft disposed in said cage, a plurality of countershafts arranged in spaced relation around said input shaft and rotatably supported by said cage, a plurality of rollers mounted on said countershafts having rolling wheel engagement with and further supporting said input shaft for rotation, some of said rollers being fixedly secured to said countershaft, a gear on each of said countershafts, an output shaft, a central gear on said output shaft meshing with each of said gears on the countershafts, whereby said rollers support said input shaft for rotation and further transmit rotary motion from the input shaft to the output shaft at a reduced rate.

5. A bearing and speed reduction mechanism comprising, a cage containing an input shaft, a plurality of countershafts in a parallel spaced relationship to the input shaft, a pair of rollers on each of said countershafts adapted for rolling contact with said input shaft for centrally supporting said input shaft between their outer peripheries, one of said rollers being fixedly secured to said countershaft for frictionally transmitting rotary motion from the input shaft to the countershafts, a gear fixedly secured on each of said countershafts, an output shaft, a gear fixedly secured on the output shaft meshing with said gear carried on the countershafts, whereby rotary motion is frictionally transmitted from the input shaft to the countershafts at a different rate by the rollers supporting the input shaft for rotation, and the gear set further transmits the rotary motion from the countershafts to the output shaft at another rate.

6. A bearing and speed transfer mechanism comprising, a cage, a power shaft disposed in said cage, a plurality of countershafts arranged in spaced relation around said power shaft and supported by said cage, a plurality of rollers mounted on said countershafts having rolling contact with and supporting said power shaft, some of said rollers being fixedly secured to said countershaft and other of said rollers being rotatable relative to said countershafts, said rollers being of a larger diameter than the diameter of the power shaft, whereby said rollers journal said power shaft for rotation and further transmit rotary motion from the power shaft to the countershafts at a reduced rate.

7. A bearing and speed transfer mechanism comprising, a power shaft having a plurality of countershafts circumferentially arranged in spaced relation relative thereto, a plurality of rotatable members carried by said countershafts and supporting said power shaft, some of said rotatable members being fixedly secured to said countershafts and other of said rotatable members being rotatable relative to said countershafts, whereby said rotatable members journal said power shaft for rotation and transmit rotary motion from the power shaft to the countershafts.

8. In a bearing and speed transfer mechanism, the combination comprising a power shaft having a plurality of countershafts positioned therearound, a rotatable member fixedly carried by each of said countershafts and engaging said power shaft, another rotatable member mounted on each of said countershafts for rotation relative thereto and frictionally engaging said power shaft whereby said rotatable members journal said power shaft for rotation and trasmit rotary motion from the power shaft to the countershafts.

9. A combined bearing and speed transfer mechanism comprising, a power shaft having a groove therein, a plurality of countershafts circumferentially spaced relative to said power shaft, a rotatable member carried by each of said countershafts and having means cooperating with said groove for restraining axial movement of said power shaft, another rotatable member fixedly secured to each of said countershafts and frictionally engageable with said power shaft, said rotatable members being of a different diameter than that of said power shaft thereby transmitting rotary motion from the power shaft to the countershafts at a different rate.

References Cited in the file of this patent

UNITED STATES PATENTS

| | | |
|---|---|---|
| 1,106,246 | Schoedelin | Aug. 4, 1914 |
| 1,127,313 | Sundh | Feb. 2, 1915 |
| 1,521,104 | Jones | Dec. 30, 1924 |
| 2,765,665 | Pickels et al. | Oct. 9, 1956 |
| 2,850,338 | Kopczynski | Sept. 2, 1958 |